(12) United States Patent
Kim

(10) Patent No.: US 8,733,956 B2
(45) Date of Patent: May 27, 2014

(54) ILLUMINATION ASSEMBLIES, CAMERAS WITH ILLUMINATION ASSEMBLIES, AND METHODS OF ASSEMBLING THE SAME

(75) Inventor: Young-wook Kim, Seongnam-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 37 days.

(21) Appl. No.: 13/268,104

(22) Filed: Oct. 7, 2011

(65) Prior Publication Data

US 2012/0188744 A1 Jul. 26, 2012

(30) Foreign Application Priority Data

Jan. 24, 2011 (KR) .................. 10-2011-0006957

(51) Int. Cl.
*G03B 15/05* (2006.01)
*G03B 15/02* (2006.01)
*G03B 15/03* (2006.01)

(52) U.S. Cl.
CPC ............... *G03B 15/05* (2013.01); *G03B 15/02* (2013.01); *G03B 15/03* (2013.01)
USPC ...... 362/11; 362/12; 362/8; 362/16; 396/155; 396/176

(58) Field of Classification Search
CPC ........ G03B 15/02; G03B 15/03; G03B 15/05; G03B 15/17
USPC ........ 362/3–18; 396/106, 157, 176, 199, 182, 396/155
See application file for complete search history.

(56) References Cited

U.S. PATENT DOCUMENTS

| | | | | |
|---|---|---|---|---|
| 4,615,599 A | * | 10/1986 | Kataoka et al. | 396/157 |
| 5,021,814 A | * | 6/1991 | Sato | 396/113 |
| 5,065,177 A | * | 11/1991 | Yamamoto et al. | 396/106 |
| 5,134,433 A | * | 7/1992 | Takami et al. | 396/165 |
| 5,262,809 A | * | 11/1993 | Nishimura et al. | 396/158 |
| 5,634,152 A | * | 5/1997 | Kato et al. | 396/158 |
| 6,155,694 A | * | 12/2000 | Lyons et al. | 362/228 |
| 6,259,862 B1 | * | 7/2001 | Marino et al. | 396/106 |
| 6,397,010 B1 | * | 5/2002 | Takahashi et al. | 396/89 |
| 7,522,830 B2 | * | 4/2009 | Hirai | 396/176 |
| 8,052,292 B2 | * | 11/2011 | Huang et al. | 362/16 |

* cited by examiner

*Primary Examiner* — Diane Lee
*Assistant Examiner* — Kenny C Sokolowski
(74) *Attorney, Agent, or Firm* — Drinker Biddle & Reath LLP

(57) ABSTRACT

Example cameras having illumination assemblies are disclosed. A disclosed camera includes an illumination holder disposed on a main body of the camera; a flash mounted on the illumination holder; an auxiliary light source mounted on the illumination holder adjacent to the flash; and a light transmission cover formed of a light transmitting material coupled to the illumination holder to cover the flash and the auxiliary light source, the illumination holder including a transfer light blocking hole at a location corresponding to a position between the flash and the auxiliary light source.

12 Claims, 4 Drawing Sheets

ILLUMINATION ASSEMBLIES, CAMERAS WITH ILLUMINATION ASSEMBLIES, AND METHODS OF ASSEMBLING THE SAME

CROSS-REFERENCE TO RELATED PATENT APPLICATION

This application claims the priority benefit of Korean Patent Application No. 10-2011-0006957, filed on Jan. 24, 2011, in the Korean Intellectual Property Office, the entirety of which is incorporated herein by reference.

BACKGROUND

1. Field of the Invention

One or more disclosed aspects invention relate to cameras including an illumination assembly, and more particularly, to cameras including an illumination assembly fabricated as a module so as to be installed conveniently and have an improved illumination performance.

2. Description of the Related Art

In designing compact cameras that are small and thin, components need to be disposed in a space-efficient manner. In general, a flash and an auto-focus (AF) assist lamp mounted on a camera require a light source to generate light and a cover guiding the generated light to be discharged outside. To dispose the flash and the AF assist lamp at separate locations on the compact camera, spaces where the flash and the AF assist lamp are respectively disposed need to be defined. When the flash and AF assist lamp are disposed separately the number of components needed may increase and additional wire connections may be needed.

SUMMARY

One or more aspects of this disclosure provide a camera, in which a flash and an assist lamp are effectively disposed so that an outer appearance of the camera may be improved and the number of components may be reduced.

One or more aspects of this disclosure also provide a camera in which a flash and an assist lamp may be adjacent to each other.

One or more aspects of this disclosure also provide a flash and an assist lamp which are adjacent to each other in a camera having an improved light emitting performance.

According to an aspect of this disclosure, there is provided a camera having an illumination holder, the camera including: an illumination holder disposed on a main body of the camera; a flash mounted on the illumination holder; an auxiliary light source mounted on the illumination holder adjacent to the flash; and a light transmission cover formed of a light transmitting material coupled to the illumination holder cover the flash and the auxiliary light source, the illumination holder including a transfer light blocking hole at a location corresponding to a position between the flash and the auxiliary light source.

The camera may further include: a cover including a first light transmission hole exposing first light emitted by the flash to outside and a second light transmission hole exposing second light emitted by the auxiliary light source to the outside; and a light shielding plate disposed in the cover facing the main body at a location corresponding to the position between the first and second light transmission holes to be inserted into the transfer light blocking hole.

The illumination holder may further include a first mounting recess, in which the flash is inserted, and a second mounting recess, in which the auxiliary light source is inserted.

The light transmission cover may include a Fresnel lens that is disposed on a location corresponding to the flash so as to diffuse the first light emitted from the flash.

The light transmission cover may further include a first protrusion that protrudes to correspond to the first light transmission hole and a second protrusion that protrudes to correspond to the second light transmission hole.

The light transmission cover may further include a supporting portion protruding toward the auxiliary light source so as to surround an end portion of the auxiliary light source.

The transfer light blocking hole may extend in a direction crossing between the flash and the auxiliary light source, and the light shielding plate may extend along the transfer light blocking hole.

The camera may include a circuit board disposed in the main body to support the illumination holder, wherein the flash and the auxiliary light source are electrically connected to the circuit board via wires passing through the illumination holder.

The flash may be mounted on the illumination holder, the auxiliary light source may be mounted on the illumination holder and the light transmission cover may be coupled to the illumination holder before the illumination holder is disposed on the main body of the camera.

According to another aspect of this disclosure, there is provided an illumination holder for a camera, the illumination holder including: a flash mounted on the illumination holder; an auxiliary light source mounted on the illumination holder adjacent to the flash; a light transmission cover formed of a light transmitting material coupled to the illumination holder to cover the flash and the auxiliary light source; and a transfer light blocking hole between the flash and the auxiliary light source.

The illumination holder may further include a first mounting recess in which the flash is inserted, and a second mounting recess in which the auxiliary light source is inserted.

The light transmission cover may include a Fresnel lens disposed on a location corresponding to the flash to diffuse light emitted by the flash.

The light transmission cover may also include a first protrusion corresponding to the first light transmission hole, and a second protrusion corresponding to the second light transmission hole.

The light transmission cover may further include a supporting portion protruding toward the auxiliary light source to surround an end portion of the auxiliary light source.

The transfer light block hole may extend in a direction crossing between the flash and the auxiliary light source.

According to yet another aspect of this disclosure, there is provided a method of assembling a camera, the method including: mounting a flash on an illumination holder; mounting an auxiliary light source on the illumination holder adjacent to the flash; coupling a light transmission cover formed of a light transmitting material coupled to the illumination holder to cover the flash and the auxiliary light source; and coupling the illumination holder with the flash, the auxiliary light source and the light transmission cover to a main body of the camera.

The method may also include coupling the illumination holder to a main body of the camera comprises electrically coupling the flash and the auxiliary light source to a circuit board of the main body via wires passing through the illumination holder.

The method may further include affixing a cover to the main body, the cover including a first light transmission hole exposing first light emitted by the flash to outside, a second light transmission hole exposing second light emitted by auxiliary light source to outside, and a light shielding plate disposed in the cover facing and extending toward the main body at a location corresponding to a position between the first and second light transmission holes.

BRIEF DESCRIPTION OF THE DRAWINGS

The above and other features of the invention will become more apparent by describing in detail exemplary embodiments thereof with reference to the attached drawings in which.

DETAILED DESCRIPTION

Hereinafter, embodiments of the invention will be described in more detail with reference to accompanying drawings.

Figure 1:
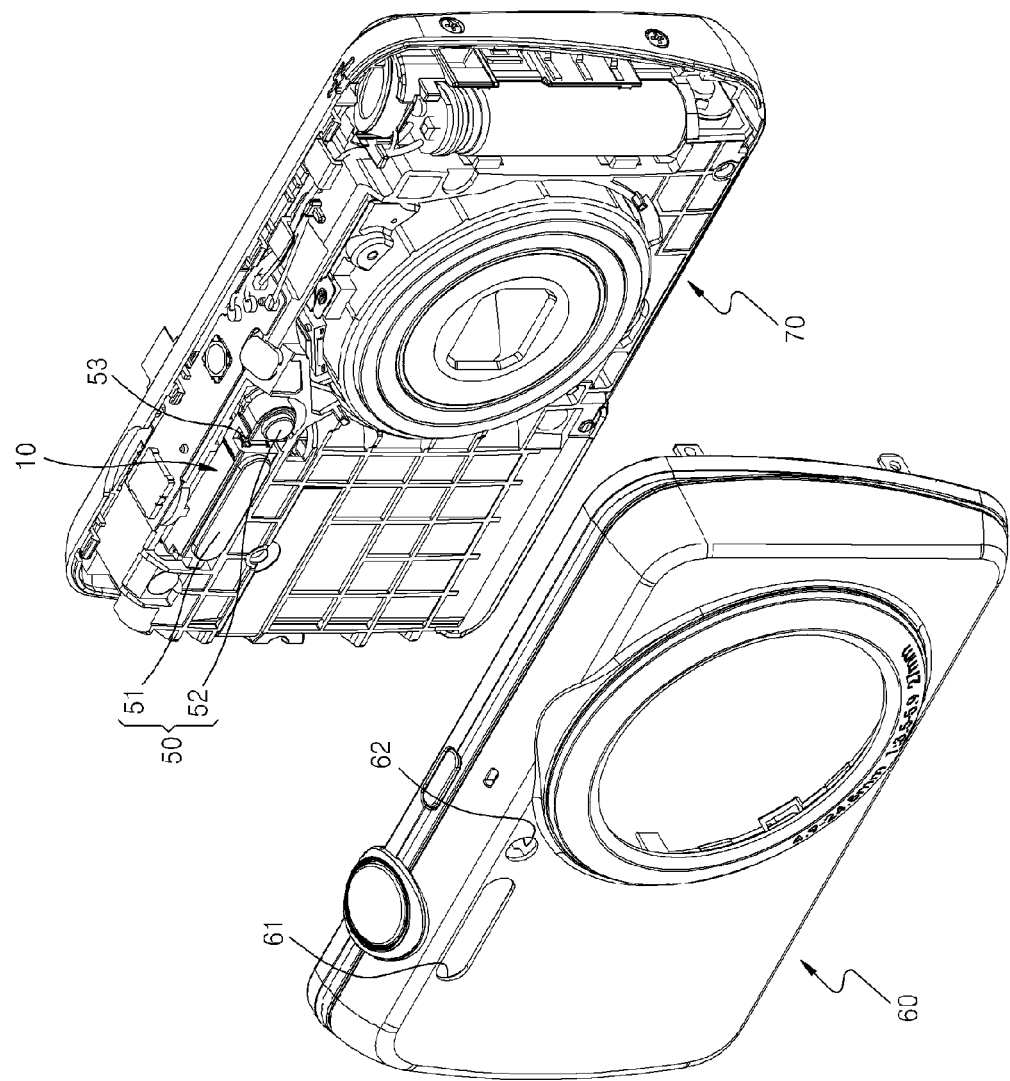
FIG. 1 is an exploded perspective view showing some components of a camera including an illumination assembly according to an embodiment of the invention.
Figure 2:
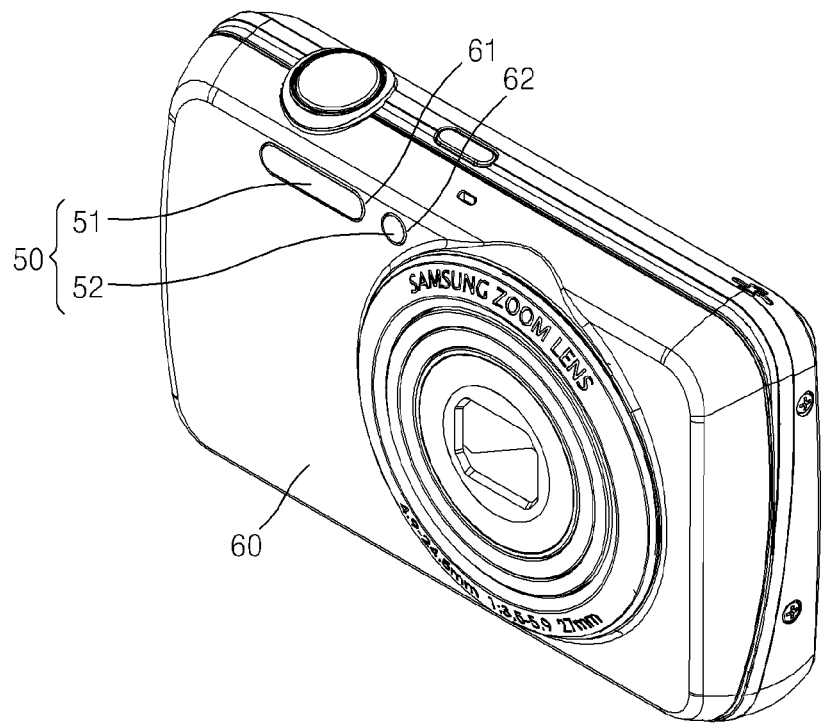
FIG. 2 is a perspective view of the camera of FIG. 1 when assembled.

FIG. 1 is an exploded perspective view showing some components of a camera including an illumination assembly 10 according to an embodiment of the invention, and FIG. 2 is a perspective view of the camera of FIG. 1 when assembled.

In the camera including the illumination assembly 10 shown in FIGS. 1 and 2, the illumination assembly 10 is installed in a main body 70 of the camera, and a light transmission cover 50 of the illumination assembly 10 is disposed so as to face a front direction of the camera. The light transmission cover 50 includes a first protrusion 51 and a second protrusion 52, and a transfer light blocking hole 53 is formed between the first and second protrusions 51 and 52.

A cover 60 is coupled to the main body 70 from the front of the main body 70. The cover 60 includes a first light transmission hole 61 in which the first protrusion 51 is inserted and a second light transmission hole 62 in which the second protrusion 52 is inserted.

Figure 3:
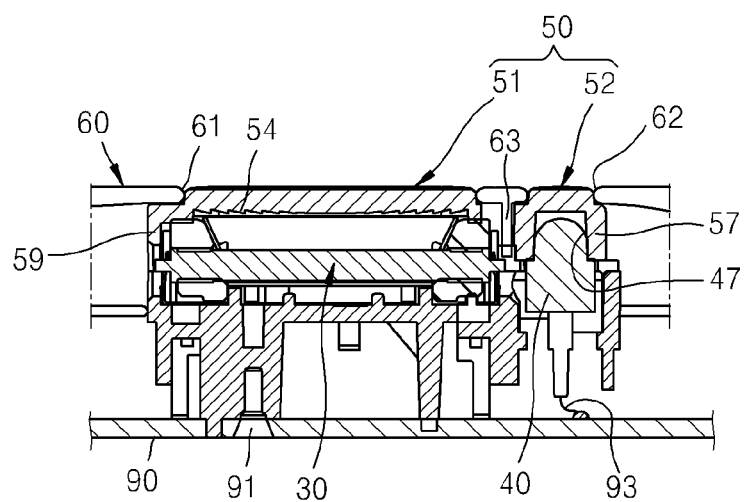
FIG. 3 is a cross-sectional view of the illumination assembly in the camera of FIG. 1.
Figure 4:
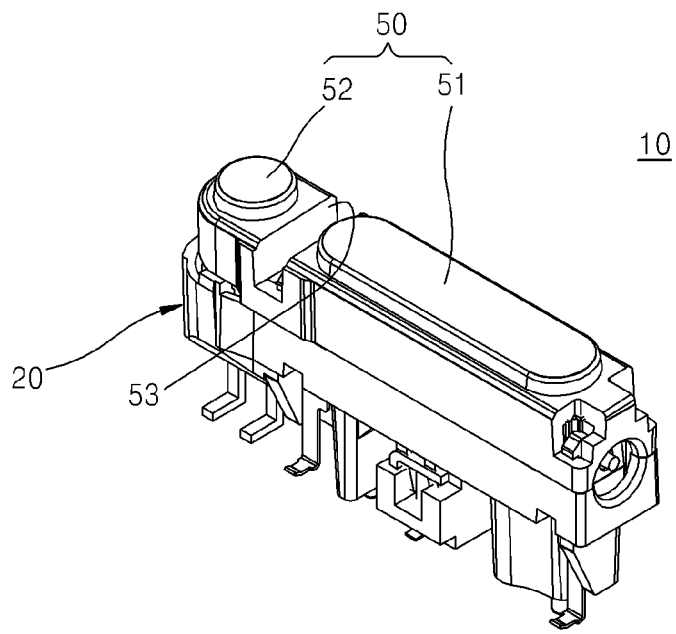
FIG. 4 is a perspective view of the illumination assembly of the camera shown in FIG. 1.
Figure 5:
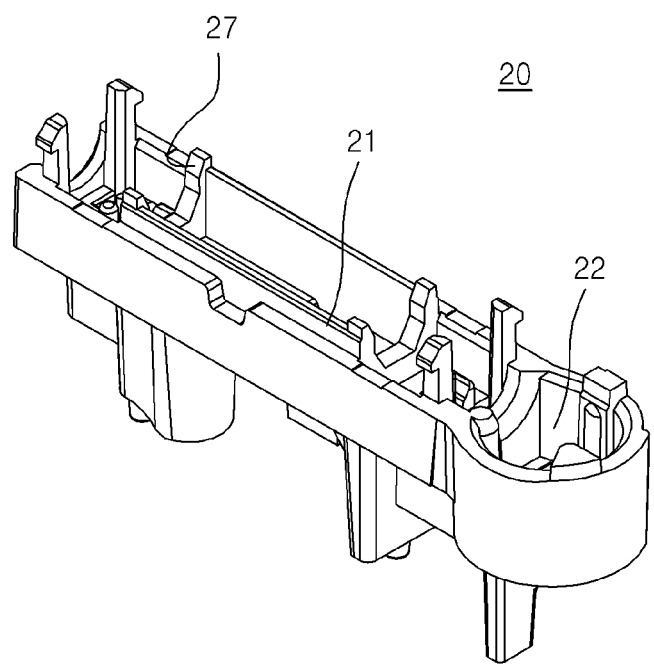
FIG. 5 is a perspective view of an illumination holder of the illumination assembly in the camera shown in FIG. 1.

FIG. 3 is a cross-sectional view of the illumination assembly 10 of the camera shown in FIG. 1, FIG. 4 is a perspective view of the illumination assembly 10 of the camera shown in FIG. 1, and FIG. 5 is a perspective view of an illumination holder 20 of the illumination assembly 10 in the camera shown in FIG. 4.

The illumination assembly 10 shown in FIGS. 3 through 5 includes the illumination holder 20 disposed in the main body 70 of FIGS. 1 and 2, a flash 30 mounted on the illumination holder 20, an auxiliary light source 40 mounted on the illumination holder 20 adjacent to the flash 30, and the light transmission cover 50 formed of a light transmitting material.

The flash 30 is a device for illuminating photographing scene by generating an instant flash. The auxiliary light source 40 is a light source used to provide additional light when an AF function for focusing a subject automatically is executed.

The light transmission cover 50 is formed of a light transmitting material such as a transparent plastic or glass, and is coupled to the illumination holder 20 to cover the flash 30 and the auxiliary light source 40. The light transmission cover 50 includes the transfer light blocking hole 53 on a location corresponding to a point between the flash 30 and the auxiliary light source 40.

The transfer light blocking hole 53 substantially blocks the light emitted from the auxiliary light source 40 from being transferred toward the flash 30 through the light transmission cover 50.

If the light transmission cover 50 does not include the transfer light blocking hole 53 and portions covering the flash 30 and the auxiliary light source 40 are connected to each other, the light emitted from the auxiliary light 40 may be transferred toward the flash 30 and, thus, an external appearance of the operating camera may not be good for persons seeing the camera. According to the present embodiment, degradation of the external appearance caused by the light transfer may be substantially prevented by the transfer light blocking hole 53.

The light transmission cover 50 includes a Fresnel lens 54 that is disposed to correspond to the flash 30. The Fresnel lens 54 diffuses the light generated by the flash 30.

The illumination holder 20 is formed of, for example, an electric insulating material such as plastic, and supports components such as the flash 30 and the auxiliary light source 40. The illumination holder 20 includes a first mounting recess 21 in which the flash 30 is inserted, and a second mounting recess 22 in which the auxiliary light source 40 is inserted.

An end portion 47 of the auxiliary light source 40 is formed as a hemisphere. The illumination holder 20 includes a supporting portion 57 that protrudes toward the auxiliary light source 40 so as to surround the end portion 47 of the auxiliary light source 40. The supporting portion 57 supports the auxiliary light source 40, and arranges positions of the components when the light transmission cover 50 is coupled to the illumination holder 20.

The illumination holder 20 is coupled to a circuit board 90 disposed in the main body 70 of the camera shown in FIG. 1 by a coupling unit 91. The auxiliary light source 40 and the flash 30 are electrically connected to the circuit board 90 by wires 93 passing through the illumination holder 20.

The light transmission cover 50 includes a coupling projection 59 on an outer edge to be coupled to the illumination holder 20. When the light transmission cover 50 is coupled to the illumination holder 20, the coupling projection 59 is inserted in the illumination holder 20 so that a coupling status of the light transmission cover 50 and the illumination holder 20 may be stably maintained.

Referring to FIG. 5, the illumination holder 20 includes a coupling projection 27 protruding toward the light transmission cover 50. The coupling projection 27 further maintains the coupling status between the light transmission cover 50 and the illumination holder 20.

When the cover 60 is coupled to a front portion of the illumination assembly 10, the first protrusion 51 is exposed to outside through the first light transmission hole 61 and the second protrusion 52 is exposed to outside through the second light transmission hole 62. A light shielding plate 63 that is inserted into the transfer light blocking hole 53 is installed in the cover 60.

Figure 6:
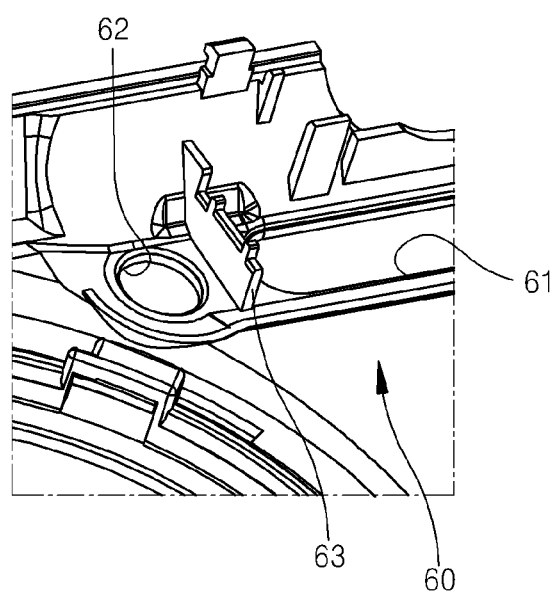
FIG. 6 is a perspective view showing a part of an inner surface of the cover covering the camera of FIG. 1.

FIG. 6 is a perspective view showing a part of an inner surface of the cover 60 in the camera of FIG. 1.

The light shielding plate 63 that is inserted into the transfer light blocking hole 53 is formed between the first light transmission hole 61 and the second light transmission hole 62 in the cover 60 facing the main body 70 of FIG. 1. The light shielding plate 63 substantially blocks the transfer of the light emitted from the auxiliary light source 40 toward the flash 30 or the transfer of the light emitted from the flash 30 toward the auxiliary light source 40.

The transfer light blocking hole 53 extends across between the flash 30 and the auxiliary light source 40, and the light shielding plate 63 extends along the extending direction of the transfer light blocking hole 53.

If the flash 30 and the auxiliary light source 40 are installed independently from the main body 70 of the camera, the light interference between the flash 30 and the auxiliary light source 40 may be substantially prevented. When components for the flash 30 and the components for the auxiliary light source 40 are separately prepared and installed, the number of components increases and it may be difficult to assemble the components.

According to the camera including the above illumination assembly 10, the illumination assembly 10 may be fabricated or assembled as one module by using the illumination holder 20. Because it is convenient to install the illumination holder 10, the flash 30 and the auxiliary light source 40 may be disposed adjacent to each other. Therefore, the components may be more efficiently disposed and used, and the outer appearance of the camera may be improved.

In addition, since the flash 30 and the auxiliary light source 40 share one light transmission cover 50, the number of components may be reduced. Also, although the light transmission cover 50 is shared, the light interference between the flash 30 and the auxiliary light source 40 may be substantially prevented by the transmission light blocking hole 53 or the light shielding plate 63.

According to cameras including the illumination assembly of the embodiments of the invention, the illumination assembly may be fabricated as one module by using the illumination holder and the light transmission holder, and thus, it is convenient to install the illumination assembly. In addition, the flash and the auxiliary light source may be installed adjacent to each other. Therefore, the components may be more efficiently disposed and used, and the outer appearance of the camera may be improved.

In addition, since the flash and the auxiliary light source share one light transmission cover, the number of components may be reduced. Also, although the light transmission cover is shared, the light interference between the flash and the auxiliary light source may be substantially prevented by the transmission light blocking hole or the light shielding plate, and thus, the light emitting performance may be improved.

The embodiments described herein may include a memory for storing program data, a processor to execute the program data, a permanent storage such as a disk drive, a communications port for handling communications with external devices, and user interface devices, including a touch panel, keys, buttons, etc. When software modules or algorithms are involved, these software modules may be stored as program instructions or computer-readable codes executable on the processor on a computer-readable medium. Examples of the computer-readable recording medium include magnetic storage media (e.g., ROM, floppy disks, hard disks, etc.), and optical recording media (e.g., CD-ROMs, or DVDs). The computer-readable recording medium can also be distributed over network coupled computer systems so that the computer-readable code is stored and executed in a distributed fashion. This media can be read by the computer, stored in the memory, and executed by the processor.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the invention could employ any number of conventional techniques for electronics configuration, signal processing and/or control, data processing and the like. The words "mechanism", "element", "means", and "configuration" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The invention is not limited to the described order of the steps. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those skilled in this art without departing from the spirit and scope of the invention.

What is claimed is:

1. A camera having an illumination holder, the camera comprising:
   the illumination holder disposed on a main body of the camera;
   a flash mounted on the illumination holder;
   an auxiliary light source mounted on the illumination holder adjacent to the flash;
   a light transmission cover formed of a light transmitting material coupled to the illumination holder to cover the flash and the auxiliary light source, the illumination holder including a transfer light blocking hole at a location corresponding to a position between the flash and the auxiliary light source;
   a cover, coupled to the main body from the front of the main body and having a fixed position relative to the main body, wherein the cover comprises a first light transmission hole exposing first light emitted by the flash to the outside and a second light transmission hole exposing second light emitted by auxiliary light source to the outside; and
   a light shielding plate disposed in the cover facing the main body at a location corresponding to a position between the first and second light transmission holes to be inserted into the transfer light blocking hole,
   wherein the camera further comprises a circuit board disposed in the main body to physically support the illumination holder by contacting the illumination holder, and
   wherein the flash and the auxiliary light source are electrically connected to the circuit board via wires passing through the illumination holder.

2. The camera of claim 1, wherein the illumination holder further comprises a first mounting recess in which the flash is inserted, and a second mounting recess in which the auxiliary light source is inserted.

3. The camera of claim 1, wherein the light transmission cover comprises a Fresnel lens that is disposed on a location corresponding to the flash so as to diffuse the first light emitted from the flash.

4. The camera of claim 1, wherein the light transmission cover further comprises a first protrusion that protrudes to correspond to the first light transmission hole and a second protrusion that protrudes to correspond to the second light transmission hole.

5. The camera of claim 4, wherein the light transmission cover further comprises a supporting portion protruding toward the auxiliary light source so as to surround an end portion of the auxiliary light source.

6. The camera of claim 1, wherein the transfer light blocking hole extends in a direction crossing between the flash and the auxiliary light source, and the light shielding plate extends along the transfer light blocking hole.

7. An illumination holder for a camera comprising:
   a flash mounted on the illumination holder;
   an auxiliary light source mounted on the illumination holder adjacent to the flash;
   a light transmission cover formed of a light transmitting material coupled to the illumination holder to cover the flash and the auxiliary light source,
   wherein the light transmission cover comprises a first protrusion configured to be inserted into a first transmission hole of a cover, and a second protrusion configured to be inserted into a second light transmission hole of the cover, wherein the cover has a fixed position relative to a main body of the camera; and
   a transfer light blocking hole between the flash and the auxiliary light source,
   a light shielding plate disposed in the cover facing the main body at a location corresponding to a position between the first and second light transmission holes to be inserted into the transfer blocking hole,
   wherein the illumination holder is supported by a circuit board disposed in the main body of the camera,
   wherein the flash and the auxiliary light source are electrically connected to the circuit board via wires passing through the illumination holder, and
   wherein the circuit board physically supports the illumination holder by contacting the illumination holder.

8. The illumination holder of claim 7, further comprising a first mounting recess in which the flash is inserted, and a second mounting recess in which the auxiliary light source is inserted.

9. The illumination holder of claim 7, wherein the light transmission cover comprises a Fresnel lens disposed on a location corresponding to the flash to diffuse light emitted by the flash.

10. The illumination holder of claim 7, wherein the light transmission cover further comprises a supporting portion protruding toward the auxiliary light source to surround an end portion of the auxiliary light source.

11. The illumination holder of claim 7, wherein the transfer light blocking hole extends in a direction crossing between the flash and the auxiliary light source.

12. A method of assembling a camera, the method comprising:
   mounting a flash on an illumination holder;
   mounting an auxiliary light source on the illumination holder adjacent to the flash;
   coupling a light transmission cover formed of a light transmitting material coupled to the illumination holder to cover the flash and the auxiliary light source;
   coupling the illumination holder with the flash, the auxiliary light source and the light transmission cover to a main body of the camera, wherein the illumination holder includes a transfer light blocking hole at a location between the flash and auxiliary light source; and
   affixing a cover to the main body, wherein the cover has a fixed position relative to the main body and comprises a first light transmission hole exposing first light emitted by the flash to outside, a second light transmission hole exposing second light emitted by auxiliary light source to the outside, and a light shielding plate disposed in the cover facing and extending toward the main body at a location corresponding to a position between the first and second light transmission holes and inserted into the transfer light blocking hole,
   wherein coupling the illumination holder to the main body of the camera comprises electrically coupling the flash and the auxiliary light source to a circuit board of the main body via wires passing through the illumination holder,
   wherein the illumination holder is supported by the circuit board disposed in the main body of the camera,
   wherein the circuit board physically supports the illumination holder by contacting the illumination holder.

* * * * *